(12) United States Patent
Agrawal et al.

(10) Patent No.: US 9,264,365 B2
(45) Date of Patent: Feb. 16, 2016

(54) SPLIT TRANSPORT CONTROL PROTOCOL (TCP) FLOW CONTROL MANAGEMENT IN A CELLULAR BROADBAND NETWORK

(75) Inventors: Dakshi Agrawal, Monsey, NY (US); Bruce O. Anthony, Jr., Pine Island, MN (US); Thai V. (Franck) Le, White Plains, NY (US); Robert B. Nicholson, Southsea (GB); Vasileios Pappas, Elmsford, NY (US); Maroun Touma, Redding, CT (US); Dinesh Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 570 days.

(21) Appl. No.: 13/563,104

(22) Filed: Jul. 31, 2012

(65) Prior Publication Data
US 2014/0036674 A1    Feb. 6, 2014

(51) Int. Cl.
| H04L 12/801 | (2013.01) |
| H04W 28/02 | (2009.01) |
| H04L 29/06 | (2006.01) |
| H04W 80/06 | (2009.01) |

(52) U.S. Cl.
CPC ............ *H04L 47/193* (2013.01); *H04L 69/163* (2013.01); *H04W 28/0273* (2013.01); *H04W 80/06* (2013.01)

(58) Field of Classification Search
CPC ..... H04L 47/10; H04L 47/2441; H04L 47/30; H04L 47/32; H04L 12/5693
See application file for complete search history.

(56) References Cited

U.S. PATENT DOCUMENTS

| 7,099,273 | B2 * | 8/2006 | Ha ......................... | H04L 1/1887 370/229 |
| 7,184,420 | B2 | 2/2007 | Son et al. | |
| 7,616,644 | B2 * | 11/2009 | Chaskar .................. | H04L 47/10 370/395.52 |
| 7,706,291 | B2 * | 4/2010 | Luft ..................... | H04L 12/2602 370/226 |
| 8,085,657 | B2 * | 12/2011 | Legg .................... | H04L 12/5693 370/229 |
| 8,140,687 | B2 * | 3/2012 | Roy ..................... | H04L 63/1466 370/236 |
| 8,284,786 | B2 * | 10/2012 | Mirandette ......... | H04L 41/5061 370/252 |
| 8,576,744 | B2 * | 11/2013 | Kovvali ............ | H04W 28/0231 370/252 |

(Continued)

FOREIGN PATENT DOCUMENTS

| WO | WO02067599 | 8/2002 |
| WO | WO03043285 | 5/2003 |

OTHER PUBLICATIONS (4) Allot Communications, White Paper, titled "Digging Deeper Into Deep Packet Inspection (DPI)" (Allot hereinafter) was published on Apr. 2007.*

(Continued)

*Primary Examiner* — Andrew Lai
*Assistant Examiner* — Hoyet H Andrews
(74) *Attorney, Agent, or Firm* — Steven M. Greenberg, Esq.; CRGO Law

(57) ABSTRACT

Embodiments of the present invention provide a method, system and computer program product for split transport control protocol (TCP) flow control management in a cellular broadband network. In an embodiment of the invention, a method for split TCP flow control management in a cellular broadband network is provided. The method includes first determining a context for a packet received as part of a data flow in a base station of a cellular broadband network and then selecting either an end-to-end TCP connection or a split TCP connection to support the data flow. Thereafter, the data flow is routed using the selected connection.

15 Claims, 3 Drawing Sheets

(56) References Cited

U.S. PATENT DOCUMENTS

| | | | |
|---|---|---|---|
| 2001/0017862 A1 | 8/2001 | Tokuyo et al. | |
| 2001/0046210 A1 | 11/2001 | West et al. | |
| 2002/0150048 A1* | 10/2002 | Ha | H04L 1/1887 370/231 |
| 2003/0035407 A1* | 2/2003 | Govindarajan | H04W 76/028 370/349 |
| 2003/0063564 A1* | 4/2003 | Ha | H04L 12/5692 370/230 |
| 2003/0123481 A1 | 7/2003 | Neale et al. | |
| 2003/0128672 A1 | 7/2003 | Komandur et al. | |
| 2003/0131079 A1 | 7/2003 | Neale et al. | |
| 2003/0137948 A1* | 7/2003 | Komandur | H04L 1/1809 370/315 |
| 2003/0212999 A1* | 11/2003 | Cai | H04L 12/66 725/119 |
| 2003/0219034 A1* | 11/2003 | Lotter | H04L 41/0823 370/469 |
| 2003/0235206 A1 | 12/2003 | Heller | |
| 2005/0185664 A1* | 8/2005 | Chaskar | H04L 47/10 370/445 |
| 2005/0188101 A1* | 8/2005 | Ludwig | H04L 47/10 709/238 |
| 2006/0262716 A1* | 11/2006 | Ramaiah | H04L 69/16 370/216 |
| 2008/0025216 A1* | 1/2008 | Singh | H04L 47/10 370/231 |
| 2009/0182945 A1* | 7/2009 | Aviles | H04L 67/2852 711/122 |
| 2009/0201813 A1* | 8/2009 | Speight | H04W 80/06 370/235 |
| 2010/0268832 A1* | 10/2010 | Lucas | H04L 69/18 709/228 |
| 2011/0103379 A1* | 5/2011 | Kim | H04L 1/1664 370/389 |
| 2011/0305138 A1* | 12/2011 | Huomo et al. | 370/230 |
| 2012/0163167 A1* | 6/2012 | Dade | H04L 47/40 370/229 |
| 2012/0215929 A1* | 8/2012 | Lucas | H04L 69/18 709/227 |

OTHER PUBLICATIONS

Allot Communications, White Paper, titled "Digging Deeper Into Deep Packet Inspection (DPI)" was published on Apr. 2007.*
Barke et al., "I-TCP: Indirect TCP for Mobile Hosts", Oct. 1994.
Barke et al., "Implementation and Performance Evaluation of Indirect TCP, " IEE Trans. on Computers, vol. 46, No. 3, Mar. 1997.
Xie et al., "Semi-Split TCP: Maintaining End-to-End Semantics for TCP split", Microsoft, 2007.

* cited by examiner

SPLIT TRANSPORT CONTROL PROTOCOL (TCP) FLOW CONTROL MANAGEMENT IN A CELLULAR BROADBAND NETWORK

BACKGROUND OF THE INVENTION

1. Field of the Invention

The present invention relates to TCP connection management and more particularly to TCP connection management in a cellular broadband network.

2. Description of the Related Art

TCP is the transport protocol that regulates the flow of packets between two networking endpoints in an Internet protocol (IP) based network. TCP is designed so that the two networking endpoints can regulate packet flow between them and can adjust the packet flow according to contemporaneous congestion in the network without involving intermediate network nodes. Thus, TCP has proven robust for a variety of networks and link characteristics. However, TCP is not without its drawbacks. Specifically, under certain network conditions, TCP flow control can result in overall packet throughput that is far less than optimal. This is particularly true in the case of a wireless link of a network where the link may suffer from heavy and correlated packet loss due to poor radio propagation characteristics of the wireless portion of the network.

Existing approaches addressing the sub-optimality of TCP flow control fall into three categories: (a) link layer protocols that hide packet loss from the transmission layer by using various techniques including forward error correction and packet retransmissions; (b) split TCP protocols where the entire end-to-end connection is broken in two parts: one for the wireless segment and another for the wireline segment (assuming that the wireless segment is at one end of the network; and (c) end-to-end protocols that modify TCP so that the modified transport protocol is specifically tailored to the characteristics of the wireless links.

These three very different classes of solutions emerged due to different characteristics encountered in different networks. Each of these solutions has known drawbacks. For example, link layer protocols hide packet losses from the transmission layer at the expense of larger round trip time. Therefore it may mislead the transmission layer regarding the status of the actual link condition. In this regard, the transmission layer may needlessly retransmit lost packets due to duplicate acknowledgements even if the lost packets have already been retransmitted by the link layer. Likewise, split TCP protocols break end-to-end semantics and do not fail gracefully if the mobility of a user causes split TCP proxy to move out of the network packet flow. Finally, end-to-end protocols require changes in the TCP stack of both endpoints and a single end-to-end protocol cannot always effectively deal with the variety of networking conditions encountered in a hybrid wireless network.

Of note, split TCP protocols generally are used to solve TCP problems with large round trip times. A typical system uses split TCP to improve TCP performance over a satellite link for example. Split TCP functions by breaking the end-to-end connection into multiple connections and using different parameters to transfer data across the different legs. The end systems use standard TCP with no modifications, and need not know of the existence of the proxies in between. Rather, split TCP intercepts TCP connections from the end systems and terminate them. This allows the end systems to run unmodified and can overcome some problems with TCP window sizes on the end systems being set too low for satellite communications. Even still, split TCP suffers several drawbacks in the wireless environment. The main drawback of the split TCP protocols in a wireless environment are: (a) non conformance to end-to-end semantics; (b) difficult hand-off between basestation or wireless access points (requires transfer of TCP state); (c) requires changes in basestation; and (d) wireless hop may require a new transmission protocol for optimal performance.

BRIEF SUMMARY OF THE INVENTION

Embodiments of the present invention address deficiencies of the art in respect to TCP flow control management and provide a novel and non-obvious method, system and computer program product for split TCP flow control management in a cellular broadband or otherwise a wireless network. In an embodiment of the invention, a method for split TCP flow control management in a cellular broadband network is provided. The method includes first determining a context for a packet received as part of a data flow in a base station of a cellular broadband network and then selecting either an end-to-end TCP connection or a split TCP connection to support the data flow. Thereafter, the data flow is routed using the selected connection.

In one aspect of the embodiment, If a context cannot be determined based on the first packet received, the system will automatically select an end-to-end TCP connection while continuously monitoring and buffering all incoming packets until such time that (a) a new context is identified which will benefit from split TCP connection and a split TCP connection is selected, or (b) a new context is identified which will not benefit from split TCP connection and all buffered packets are discarded and end-to-end TCP connection continues.

In one aspect of the embodiment, the context is determined using deep packet inspection. In another aspect of the embodiment, shallow packet inspection is used initially to determine the context prior to deep packet inspection and deep packet inspection can be avoided if the context is determined using shallow packet inspection. However, if shallow packet inspection is unable to determine the context, deep packet inspection of multiple sequential packets can then be used to determined the context for the data flow. In this way, by identifying the context of the network flow, undesirable side-effects of a split TCP connection can be avoided. For example, where the context of the network flow calls for conformance to end-to-end semantics, an end-to-end TCP connection can be selected, but where optimization can be achieved through the use of a split TCP protocol and end-to-end semantics are not required, a split TCP connection through a split TCP proxy can be used.

In one aspect of the embodiment, if a context switch occurs requiring the system to select a split TCP connection based on deep packet inspection when it had initially selected an end-to-end connection, a split TCP connection is initiated by creating two entries in the TCP stack that are synchronized with the end-to-end flow in the network.

In another embodiment of the invention, a cellular broadband data processing system can be configured for split TCP flow control management. The system can include different base stations, each in a correspondingly different cell site of a cellular broadband network. The system further can include different host computing systems each disposed in correspondingly different ones of the base stations and each including at least one computer with at least one processor and memory. The system yet further can include different edge routing modules each executing in correspondingly different ones of the host computing systems and routing data flows over different TCP connections to different specified content servers. Finally, the system can include different split TCP selection modules each coupled to a different one of the edge routing modules. Each of the split TCP selection modules can include program code enabled to determine a context for a packet received as part of a data flow, to select a connection selected from the group consisting of an end-to-end TCP connection and a split TCP connection to support the data flow, and to direct a coupled one of the edge routing modules to route the data flow using the selected connection.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for split TCP flow control management in a cellular broadband network. In accordance with an embodiment of the invention, a packet can be received in a base station within a cellular broadband network. The packet can be inspected to determine whether an underlying application requires end-to-end semantics or other properties that are not preserved by the split TCP. For example, if the client is determined to be mobile, and if during the lifetime of the TCP connection the client is expected to be moving to forwarding paths where its traffic cannot be redirected and processed by split TCP, the end-to-end semantics must be preserved.

If the end-to-end semantics and other properties not preserved by split TCP are not required, the packet can be route to an intended endpoint using split TCP. Otherwise, the packet can be routed using an end to end TCP connection to the endpoint. In this way, split TCP can be employed only where end to end semantics and other properties not preserved by the split TCP are not required for an underlying application associated with the received packet.

Figure 1:
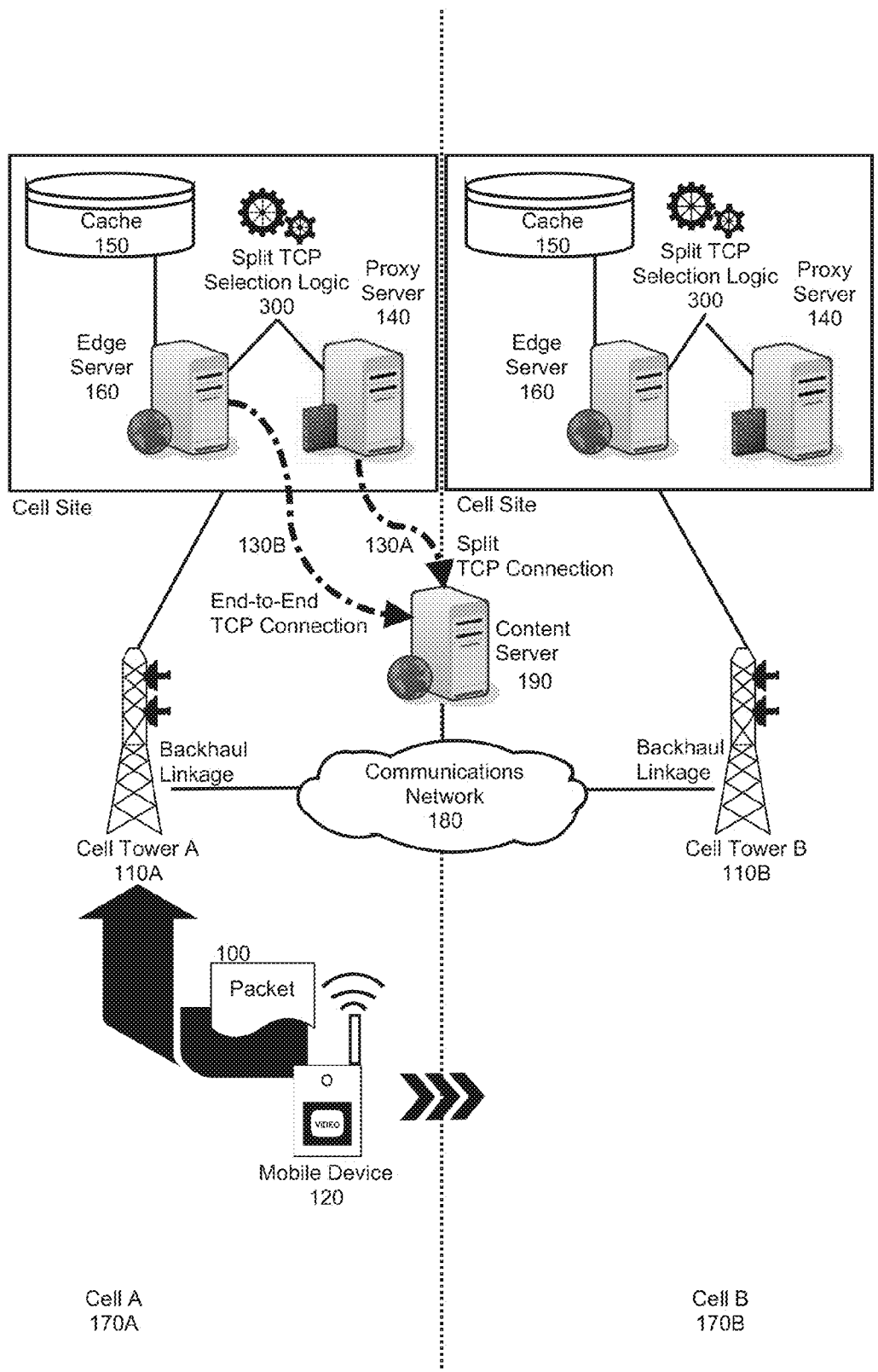
FIG. 1 is a pictorial illustration of a process for split TCP flow control management in a cellular broadband network.

In further illustration, FIG. 1 is a pictorial illustration of a process for split TCP flow control management in a cellular broadband network. As shown in FIG. 1, a mobile device can engage in voice and data communications in a cellular mobile network of different cell sites 170A, 170B that include different cell towers 110A, 110B coupled to one another through a backhaul linkage to a computer communications network. Each of the cell sites 170A, 170B can include an edge server 160 providing edge processing of data requests for content from a content server 190 received from the mobile device 120, and a cache 150 from which the data requests can be satisfied when requested content is present in the cache 150 thereby relieving the content server 190 from responding to a corresponding one of the data requests over an end-to-end TCP connection 130B.

Of note, split TCP selection logic 300 can be coupled to the edge server 160 and also a proxy server 140 through which a split TCP connection 130A to the content server 190 can be established and managed. The split TCP selection logic 300 can receive a data packet 100 within cellular data and can determine a context for the packet 100. To the extent required to determine the context of the packet 100, the split TCP selection logic 300 can submit the packet 100 for deep packet inspection. Utilizing the context, the split TCP selection logic 300 can determine whether or not the packet 100 is part of a data flow able to be optimally communicated between the mobile device 120 and the content server 190 using a split TCP connection 130A such as would be the case in a stateless computing session or during the streaming of media from the content server 190 to the mobile device 120, or whether the data flow is optimally communicated between the mobile device 120 and the content server 190 using an end-to-end TCP connection, such as would be the case with a stateful computing session between the mobile device 120 and the content server 190. Thereafter, the split TCP selection logic 300 can direct the use of a split TCP connection 130A or an end-to-end TCP connection 130B accordingly.

Figure 2:
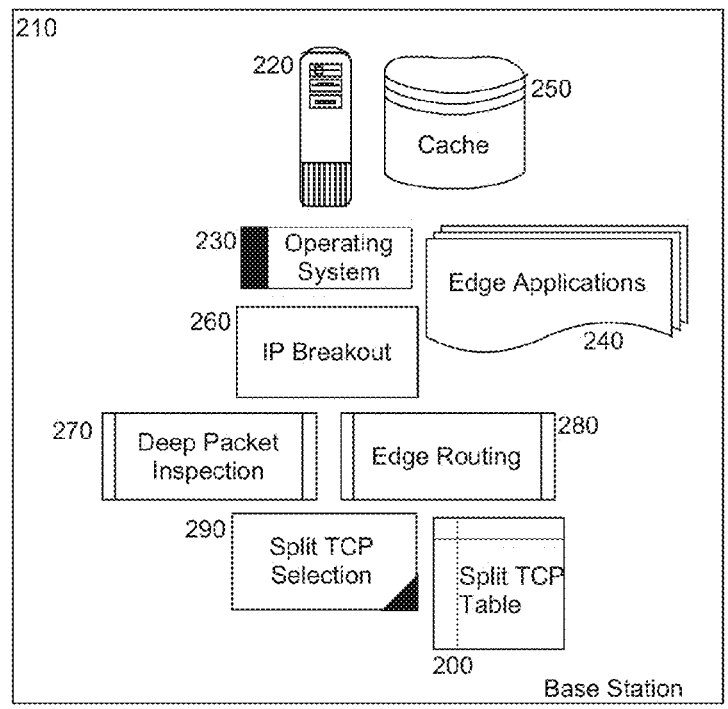
FIG. 2 is a schematic illustration of a cellular broadband data processing system configured for split TCP flow control management.

The process described in connection with FIG. 1 can be implemented within a cellular broadband data processing system such as a cellular base station. In yet further illustration, FIG. 2 is a schematic illustration of a cellular broadband data processing system configured for split TCP flow control management. The system can include a base station 210 that includes a host computing system 220 of one or more computers each with at least one processor and memory. The host computing system 210 can support the execution of an operating system 230 supporting the operation of one or more edge applications 240 and a cache 250 from which requested data can be served to a requesting mobile device (not shown).

An Internet protocol (IP) breakout module 260 also can operate in the operating system 230 can be configured to extract from cellular data different IP data packets. An edge routing module 280 also can operate in the operating system 230 and can be configured to route IP data packets extracted by the IP breakout module 260 to a target destination using either an end-to-end TCP connection, or a split TCP connection as directed by a split TCP selection module 290. In this regard, the split TCP selection module 290 also can operate in the operating system 230 and can include program code enabled to submit a received data packet of a data flow to deep packet inspection module 270 in order to determine a context of the data flow, such as an application type utilizing the data flow. The program code of the split TCP selection module 290 further can locate within a split TCP table 200 a selection of connection type--namely, an end-to-end TCP connection or a split TCP connection, according to the determined context received from the deep packet inspection module 270. Thereafter, the program code of the split TCP selection module 290 can direct the edge routing module 280 to route data packets of the data flow according to the selected connection type.

Figure 3:
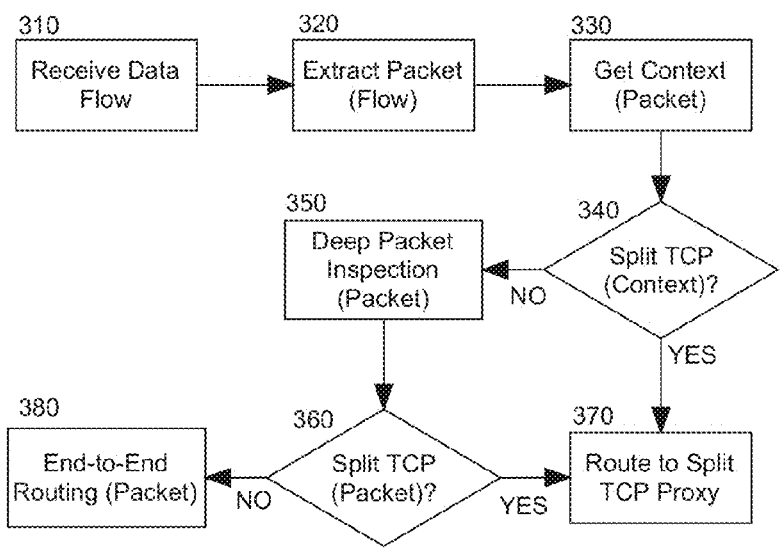
FIG. 3 is a flow chart illustrating a process for split TCP flow control management in a cellular broadband network; and, FIG. 4 is a low chart illustrating illustration of a process for selecting between a split TCP connection and an end-to-end connection.

In yet further illustration of the operation of the split TCP selection module 290, FIG. 3 is a flow chart illustrating a process for split TCP flow control management in a cellular broadband network. Beginning in block 310, a data flow can be received in a base station and a packet can be extracted from the data flow in block 320. In block 330 a context can be determined for the packet using shallow packet inspection, such as information evident in the header of the packet alone. For example, from the source IP address, block 330 can derive the identity of the client, retrieve a mobility profile, and determine whether the client is a mobile or stationary node. If the node is stationary, the TCP connection does not require end-to-end semantics but the TCP connection can be redirected to the split TCP proxy. In addition to the mobility profile, additional information can be used to make the decision: For example, the mobility profile may indicate that the node is mobile but will not be moving for the coming three hours. Then, from the destination IP address, block 330 can retrieve a connection profile and observe that all connections to that server last less than 10 minutes, As such, during the lifetime of this TCP connection, the end-to-end semantics are not required either and the connection can be redirected to a split TCP proxy. In decision block 340, if it can be determined from the context alone to select a split TCP connection to route the data flow, in block 370 the data flow can be routed to a target content server using a split TCP proxy. Otherwise, the process can continue through block 350.

In block 350, the packet can be submitted for deep packet inspection. In this regard, the data payload of the packet can be parsed and analyzed during deep packet inspection to determine a context for the data flow—namely whether or not the context of the data flow calls for a split TCP connection or an end-to-end TCP connection. For example, the using shallow packet inspection may only learn that the user is about to move in one hour, and connections with the identified server can last multiple hours. Deep packet inspection may further reveal that the user is downloading a small file, or listening to a short audio file, which may only last 5 minutes. As such, deep packet inspection can help determine that the connection can be redirected to a split TCP proxy. In decision block 360, if it is determined that the data flow can be optimally directed to the target content server using a split TCP connection, in block 370 the data flow can be routed to the target content server using a split TCP proxy. Otherwise, if in decision block 360 it is determined that the data flow can be optimally directed to the target content server using an end-to-end TCP connection, in block 380 the data flow can be routed to the target content server using an end-to-end TCP connection.

In another embodiment, the connection can begin as a split TCP connection regardless of the context. The split TCP connection is created in such a way that sequence numbers initially match in the TCP proxy end point in the connection between the client and the TCP proxy) and the server end point in the connection between the TCP proxy and the server. The same must be true of sequence numbers in the client in the connection between the client and the TCP proxy and the TCP proxy in the connection between the TCP proxy and the server.

Initially, the split TCP is throttled in such a way that these numbers remain exactly or closely matching. For example, if the connection between the TCP proxy and server is running faster, it is throttled so that its sequence number does not run too far ahead of the other side of the split TCP connection. This provides the connection manager an opportunity to examine the context (e.g., by deep inspection of the request/response headers) to determine whether the connection should continue in a split TCP manner. If the connection should continue in a split TCP manner, the sequence numbers of two sides of the connection are allowed to drift. However, if the end-to-end connection should not continue in the split TCP state, the split TCP is patched and the TCP proxy is removed from the network path.

Figure 4:
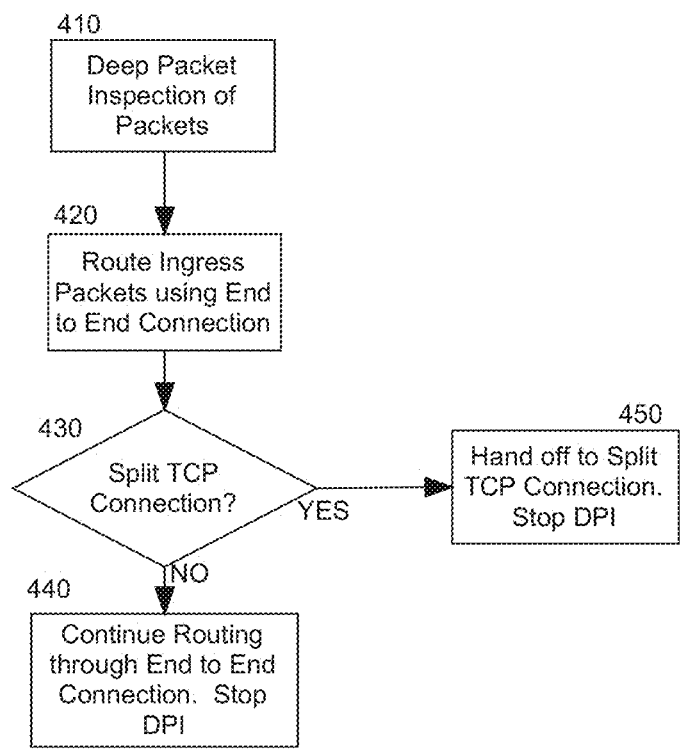

In even yet further illustration, FIG. 4 is a flow chart illustrating a process for selecting between a split TCP connection and an end-to-end connection. Initially, in block 410 deep packet inspection can be performed on inbound packets and in block 420 the packets can be routed to an end-to-end TCP connection regardless of the context. Then, if the split TCP selection module determines in block 430 that the flow should be processed by a TCP split proxy, a hand-off to a TCP split connection is made in block 450 where the flow is redirected to the TCP split proxy, and the TCP split proxy is inserted in the TCP connection. Otherwise, in block 440 the packets can be processed according to the end-to-end connection.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one orhjy more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for split transport control protocol (TCP) flow control management in a cellular broadband network, the method comprising:
   determining both a context for a packet received as part of a data flow in a base station of a cellular broadband network and also whether or not based upon the context the packet is part of a data flow able to be optimally communicated using a split TCP connection, or whether the data flow is optimally communicated using an end-to-end TCP connection;
   selecting a connection selected from the group consisting of an end-to-end TCP connection and a split TCP connection to support the data flow in accordance with the determined ability for optimal communications of the data flow utilizing either the split TCP connection or the end-to-end TCP connection; and,
   routing the data flow using the selected connection.

2. The method of claim 1, wherein the context is determined using deep packet inspection.

3. The method of claim 2, further comprising:
   using shallow packet inspection to determine the context prior to deep packet inspection; and,
   foregoing deep packet inspection if the context is determined using shallow packet inspection, but otherwise using deep packet inspection to determined the context for the packet.

4. The method of claim 1, wherein the data flow is routed to a split TCP proxy when the split TCP connection is selected to support the data flow, and the data flow is routed to a target content server directly using an end-to-end TCP connection with the end-to-end TCP connection is selected.

5. The method of claim 1, wherein the data flow is first routed using an end-to-end TCP connection and a hand-off to a TCP split connection is made when a new context is determined.

6. A cellular broadband data processing system configured for split transport control protocol (TCP) flow control management, the system comprising:
- a plurality of base stations, each in a correspondingly different cell site of a cellular broadband network;
- a plurality of host computing systems each disposed in correspondingly different ones of the base stations, each of the host computing systems comprising at least one computer with at least one processor and memory;
- a plurality of edge routing modules each executing in correspondingly different ones of the host computing systems and routing data flows over different TCP connections to different specified content servers; and,
- a plurality of split TCP selection modules each coupled to a different one of the edge routing modules, each of the split TCP selection modules comprising program code enabled to determine both a context for a packet received as part of a data flow and also whether or not based upon the context the packet is part of a data flow able to be optimally communicated using a split TCP connection, or whether the data flow is optimally communicated using an end-to-end TCP connection, to select a connection selected from the group consisting of an end-to-end TCP connection and a split TCP connection to support the data flow in accordance with the determined ability for optimal communications of the data flow utilizing either the split TCP connection or the end-to-end TCP connection, and to direct a coupled one of the edge routing modules to route the data flow using the selected connection.

7. The system of claim 6, wherein the context is determined using deep packet inspection.

8. The system of claim 7, wherein each of the split TCP selection modules uses shallow packet inspection to determine the context prior to deep packet inspection, and foregoes deep packet inspection if the context is determined using shallow packet inspection, but otherwise uses deep packet inspection to determined the context for the packet.

9. The system of claim 6, wherein each of the edge routing modules routes the data flow to a split TCP proxy when the split TCP connection is selected to support the data flow, and each of the edge routing modules routes the data flow to a target content server directly using an end-to-end TCP connection with the end-to-end TCP connection is selected.

10. The system of claim 6, wherein the data flow is first routed using an end-to-end TCP connection and a hand-off to a TCP split connection is made when a new context is determined.

11. A computer program product for split transport control protocol (TCP) flow control management in a cellular broadband network, the computer program product comprising:
- a non-transitory computer readable storage medium having computer readable program code embodied therewith, the computer readable program code comprising:
- computer readable program code for execution by a processor for determining both a context for a packet received as part of a data flow in a base station of a cellular broadband network and also whether or not based upon the context the packet is part of a data flow able to be optimally communicated using a split TCP connection, or whether the data flow is optimally communicated using an end-to-end TCP connection;
- computer readable program code for execution by the processor for selecting a connection selected from the group consisting of an end-to-end TCP connection and a split TCP connection to support the data flow in accordance with the determined ability for optimal communications of the data flow utilizing either the split TCP connection or the end-to-end TCP connection; and,
- computer readable program code for execution by the processor for routing the data flow using the selected connection.

12. The computer program product of claim 11, wherein the context is determined using deep packet inspection.

13. The computer program product of claim 11, further comprising:
- computer readable program code for using shallow packet inspection to determine the context prior to deep packet inspection; and,
- computer readable program code for foregoing deep packet inspection if the context is determined using shallow packet inspection, but otherwise using deep packet inspection to determined the context for the packet.

14. The computer program product of claim 11, wherein the data flow is routed to a split TCP proxy when the split TCP connection is selected to support the data flow, and the data flow is routed to a target content server directly using an end-to-end TCP connection with the end-to-end TCP connection is selected.

15. The computer program product of claim 11, wherein the data flow is first routed using an end-to-end TCP connection and a hand-off to a TCP split connection is made when a new context is determined.

* * * * *